B. F. ENGLAR.
ICE CREAM DIPPER.
APPLICATION FILED JULY 10, 1919.
1,325,082.
Patented Dec. 16, 1919.
Fig. 1.
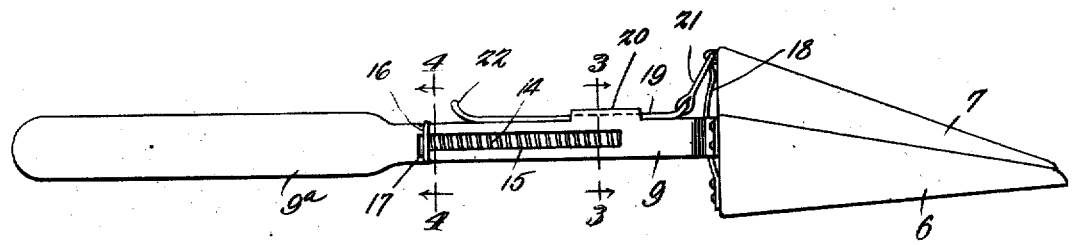
Fig. 2.
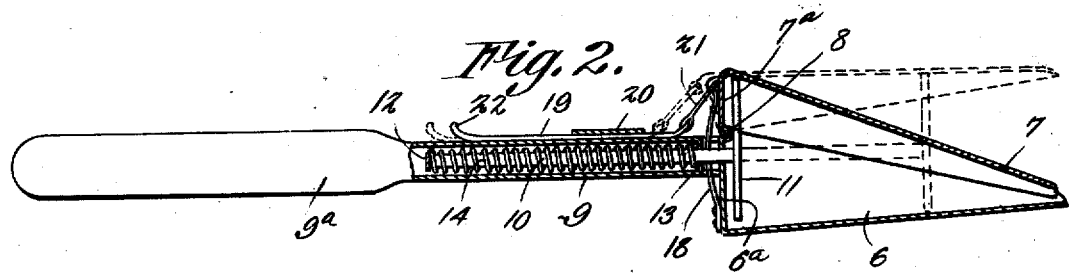
Fig. 3.
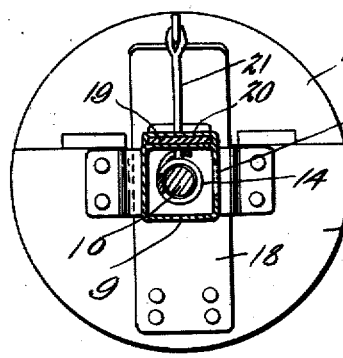
Fig. 4.
Fig. 5.
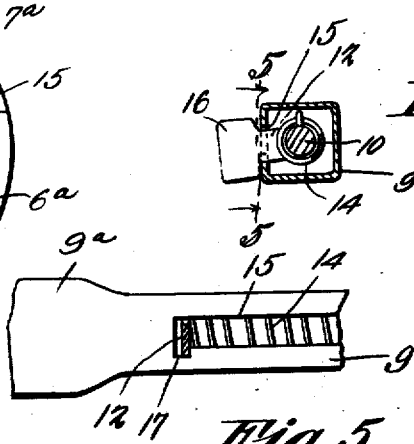
INVENTOR.
Benjamin F. Englar
BY
Henry G. Bennington
ATTORNEY.

UNITED STATES PATENT OFFICE.

BENJAMIN F. ENGLAR, OF BALTIMORE, MARYLAND.

ICE-CREAM DIPPER.

1,325,082.   Specification of Letters Patent.   Patented Dec. 16, 1919.

Application filed July 10, 1919. Serial No. 309,843.

*To all whom it may concern:*

Be it known that I, BENJAMIN F. ENGLAR, a citizen of the United States, residing at Baltimore, State of Maryland, have invented certain new and useful Improvements in Ice-Cream Dippers, of which the following is a specification.

This invention relates to hand operated implements for cutting into a mass of ice cream, and removing a measured quantity, which is molded and discharged into an edible container known as a "cone".

The invention has for its object to provide a novel and improved implement of the kind stated, which is simple in construction and rapid and efficient in operation, and to this end, the invention consists in a combination and arrangement of parts to be hereinafter described and claimed.

In order that the invention may be better understood, reference is had to the accompanying drawing forming a part of this specification.

In the drawing,

Figure 1 is an elevation of the implement;

Fig. 2 is a similar view, partly in section;

Figs. 3 and 4 are cross sections on the lines 3—3 and 4—4, respectively, of Fig. 1, and Fig. 5 is a sectional detail on the line 5—5 of Fig. 4.

Referring specifically to the drawing, the implement resembles a scoop, the bowl or spoon portion of the implement being composed of two pivotally connected sections, so shaped, that when they are closed up, they form a mold having a contour to give the lump of ice cream a shape substantially that of a cone. These two sections are shown at 6 and 7, respectively, their sides being curved in cross section and tapered toward their outer end, the latter being the apex of the cone. The rear walls of the sections form the base of the cone, they being straight, and perpendicular to the axis of the cone. These two rear walls, denoted by the reference characters 6ª and 7ª, respectively, are connected by a suitable hinge joint 8, to enable the bowl sections 6 and 7 to be spread or opened up as shown dotted in Fig. 2.

To the wall 6ª is connected a hollow handle shank 9 having at its outer end a suitable hand grip 9ª. The shank 9 incloses a slidable rod 10 which passes at one end into the bowl sections 6 and 7 through an aperture in the wall 6ª, and is fitted inside said sections with an ejector plunger 11. The other end of the rod 10 has an abutment 12, between which latter, and an abutment 13 in the shank 9, a spring 14 is coiled around the rod. This spring serves to advance the plunger 11 when the rod 10 is released. The rod 10 is held retracted by providing the abutment 12 with a lateral extension which passes through a longitudinal slot 15 in the shank 9 and has on the outside of the latter a finger piece 16. The rear end of the slot 15 terminates in a downwardly extending notch 17 in which the abutment 12 is adapted to be seated as shown in Figs. 4 and 5, and thus lock the rod 10 in retracted position. Upon swinging the part 12 out of the notch 17 and into alinement with the slot 15, the rod 10 is released and the spring 14 is then permitted to advance the same, whereupon the plunger 11 is advanced as shown dotted in Fig. 2, to push the mass of ice cream out of the bowl sections 6 and 7, after opening the latter. To retract the plunger 11 to its normal position close to the rear walls 6ª and 7ª of the bowl sections, it is necessary only to draw the finger piece 16 back and swing it downward to again seat the part 12 in the notch 17, whereupon the plunger is again locked in retracted position.

The bowl section 7 is held normally closed down over the section 6 by a flat spring 18 secured to the outer face of the wall 6ª and bearing at its free end against the outer face of the wall 7ª.

The bowl section 7 is swung open by a slide bar 19 seating under a guide 20 on the shank 9 and having one end connected by a link 21 to the wall 7ª. The other end of the slide bar is turned up, as shown at 22, so that it may be readily engaged by the finger and drawn back to open the section 7, and upon releasing the slide bar, said section is swung closed by the spring 18.

In use, the bowl section 7 is swung open as shown dotted in Fig. 2, and the bowl or spoon portion is forced into the mass of ice cream. The bowl section 7 is then released, whereupon the spring 18 closes it, and the ice cream is molded by said section and the section 6 into the form of a cone. The section 7 is now again swung open, and the rod 10 is released, whereupon the plunger 11 slides forward as shown dotted in Fig. 2, and discharges the molded cone of ice cream.

I claim:

1. An ice cream mold, comprising a scoop having a bowl composed of two pivotally connected sections shaped to mold the ice cream when closed around the same, an ejector plunger in the bowl, a slidable rod carrying the plunger, a hollow handle shank carrying the bowl, said shank housing the rod and having a longitudinal slot provided at one end with a locking notch, a finger piece extending laterally from the rod and adapted to be seated in the notch, means for sliding the rod forward to advance the plunger when the finger piece is disengaged from the notch, a spring engageable with one of the bowl sections for forcing the same closed, and means for opening said bowl section.

2. An ice cream mold, comprising a scoop having a bowl composed of two pivotally connected sections shaped to mold the ice cream when closed around the same, an ejector plunger in the bowl, operating means for the plunger, a handle shank carrying the bowl, a spring engageable with one of the bowl sections for forcing the same closed, a slide having a connection with the last mentioned bowl section for opening the same, and a guide on the handle shank for the slide.

In testimony whereof I affix my signature in the presence of two witnesses.

BENJAMIN F. ENGLAR.

Witnesses:
E. WALTON BREWINGTON,
HOWARD D. ADAMS.